United States Patent
Tojo et al.

(10) Patent No.: US 9,150,216 B2
(45) Date of Patent: Oct. 6, 2015

(54) DRIVE FORCE CONTROL SYSTEM

(71) Applicant: Aisin Seiki Kabushiki Kaisha, Kariya-shi (JP)

(72) Inventors: Takeshi Tojo, Kariya (JP); Kyosuke Mori, Kariya (JP); Takahiro Misu, Nagoya (JP); Yo Shishido, Nisshin (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 14/184,834

(22) Filed: Feb. 20, 2014

(65) Prior Publication Data

US 2014/0243148 A1 Aug. 28, 2014

(30) Foreign Application Priority Data

Feb. 27, 2013 (JP) ................. 2013-037951

(51) Int. Cl.
  *B60W 10/06* (2006.01)
  *B60W 20/00* (2006.01)
  *B60W 50/06* (2006.01)
  *B60K 6/48* (2007.10)
  (Continued)

(52) U.S. Cl.
  CPC .............. *B60W 20/10* (2013.01); *B60K 6/48* (2013.01); *B60W 10/06* (2013.01); *B60W 10/08* (2013.01); *B60W 20/00* (2013.01); *B60W 20/1088* (2013.01); *B60W 30/188* (2013.01); *B60W 30/18027* (2013.01); *B60W 50/06* (2013.01); *B60W 2540/106* (2013.01); *Y02T 10/6221* (2013.01); *Y02T 10/7258* (2013.01); *Y10S 903/902* (2013.01); *Y10T 477/23* (2015.01)

(58) Field of Classification Search
  CPC .............. B60W 20/10; B60W 20/102; B60W 2510/0604; B60W 2510/0609; B60W 2540/106; Y10Y 477/23; F16H 59/141
  USPC ......................................... 477/3, 905; 701/22
  See application file for complete search history.

(56) References Cited

U.S. PATENT DOCUMENTS

2002/0029624 A1  3/2002  Gassner et al.
2008/0228334 A1*  9/2008  Hashimoto ..................... 701/22
(Continued)

FOREIGN PATENT DOCUMENTS

DE  10 2006 013 676 A1  9/2007
DE  10 2007 050 113 A1  4/2009
(Continued)

OTHER PUBLICATIONS

Machine translation of DE 10 2006 013 676 A1 (1) Sep. 27, 2007.*
(Continued)

*Primary Examiner* — Roger Pang
(74) *Attorney, Agent, or Firm* — Oblon, McClelland, Maier & Neustadt, L.L.P.

(57) ABSTRACT

A drive force control system includes an engine for controlling an output in accordance with an operation of an accelerator of a vehicle, a drive motor assisting a torque of the engine, an operation state detection portion detecting an operation state of the accelerator, and a control portion performing an advancing compensation control by the drive motor together with a drive control of the engine on the basis of an amount of change of the operation state of the accelerator generated within a predetermined time to provide greater acceleration than a case where the operation state of the accelerator is maintained.

14 Claims, 9 Drawing Sheets

(51) Int. Cl.
*B60W 10/08* (2006.01)
*B60W 30/18* (2012.01)
*B60W 30/188* (2012.01)

(56) References Cited

U.S. PATENT DOCUMENTS

| | | | |
|---|---|---|---|
| 2008/0228363 A1* | 9/2008 | Kouno et al. | 701/54 |
| 2009/0048063 A1* | 2/2009 | Silveri et al. | 477/3 |
| 2010/0250042 A1* | 9/2010 | Shamoto | 701/22 |
| 2011/0276251 A1 | 11/2011 | Kang et al. | |

FOREIGN PATENT DOCUMENTS

| | | |
|---|---|---|
| JP | 2010-167982 | 8/2010 |
| JP | 2013001158 A * | 1/2013 |

OTHER PUBLICATIONS

Machine translation of DE 10 2006 013 676 A1 (2) Sep. 27, 2007.*
Machine translation of JP 2010-167982 Aug. 5, 2010.*
Extended European Search Report issued on Jun. 23, 2014 in the corresponding European Application No. 14154807.3.

* cited by examiner

DRIVE FORCE CONTROL SYSTEM

CROSS REFERENCE TO RELATED APPLICATIONS

This application is based on and claims priority under 35 U.S.C. §119 to Japanese Patent Application 2013-037951, filed on Feb. 27, 2013, the entire content of which is incorporated herein by reference.

TECHNICAL FIELD

This disclosure generally relates to a drive force control system.

BACKGROUND DISCUSSION

A known vehicle which includes an engine and a drive motor for assisting an engine is disclosed. According to the known vehicle, the engine and the drive motor are cooperated so that the acceleration is attained in accordance with the accelerator pedal operation amount (accelerator pedal position). As disclosed in JP2010-167982A, for example, according to the known vehicle, target acceleration is determined in accordance with an operation state of the accelerator. Thus, even if the acceleration is compensated to achieve the targeted acceleration which is in accordance with the operation state of the accelerator, a delay is generated until a driver feels that the vehicle is accelerated sufficiently. Consequently, there is a drawback that that the driver cannot attain a feel of the desired acceleration, for example, when the vehicle starts moving.

A need thus exists for a drive force control system which is not susceptible to the drawback mentioned above.

SUMMARY

In light of the foregoing, the disclosure provides a drive force control system, which includes an engine for controlling an output in accordance with an operation of an accelerator of a vehicle, a drive motor assisting a torque of the engine, an operation state detection portion detecting an operation state of the accelerator, and a control portion performing an advancing compensation control by the drive motor together with a drive control of the engine on the basis of an amount of change of the operation state of the accelerator generated within a predetermined time to provide greater acceleration than a case where the operation state of the accelerator is maintained.

According to another aspect of this disclosure, a drive force control system includes a drive motor for performing an output in accordance with an operation of an accelerator of a vehicle, an operation state detection portion detecting an operation state of the accelerator, and a control portion performing an advancing compensation control performing a torque assist by the drive motor at an initial stage when the vehicle starts moving from a stopped state on the basis of an amount of change of the operation state of the accelerator generated within a predetermined time to make acceleration at the initial stage of the accelerator operation be greater than at a normal operation after the vehicle starts moving.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment of a vehicle drive force transmission system (drive force control system) will be explained with reference to illustrations of drawing figures as follows.

According to the embodiment, various systems and parts which are necessary for driving an internal combustion engine and an electric motor can be mounted to a vehicle. Modes or system, the number, and the layout, for example, in association with driving wheels of the vehicle can be configured, or modified in various manners.

Figure 1:
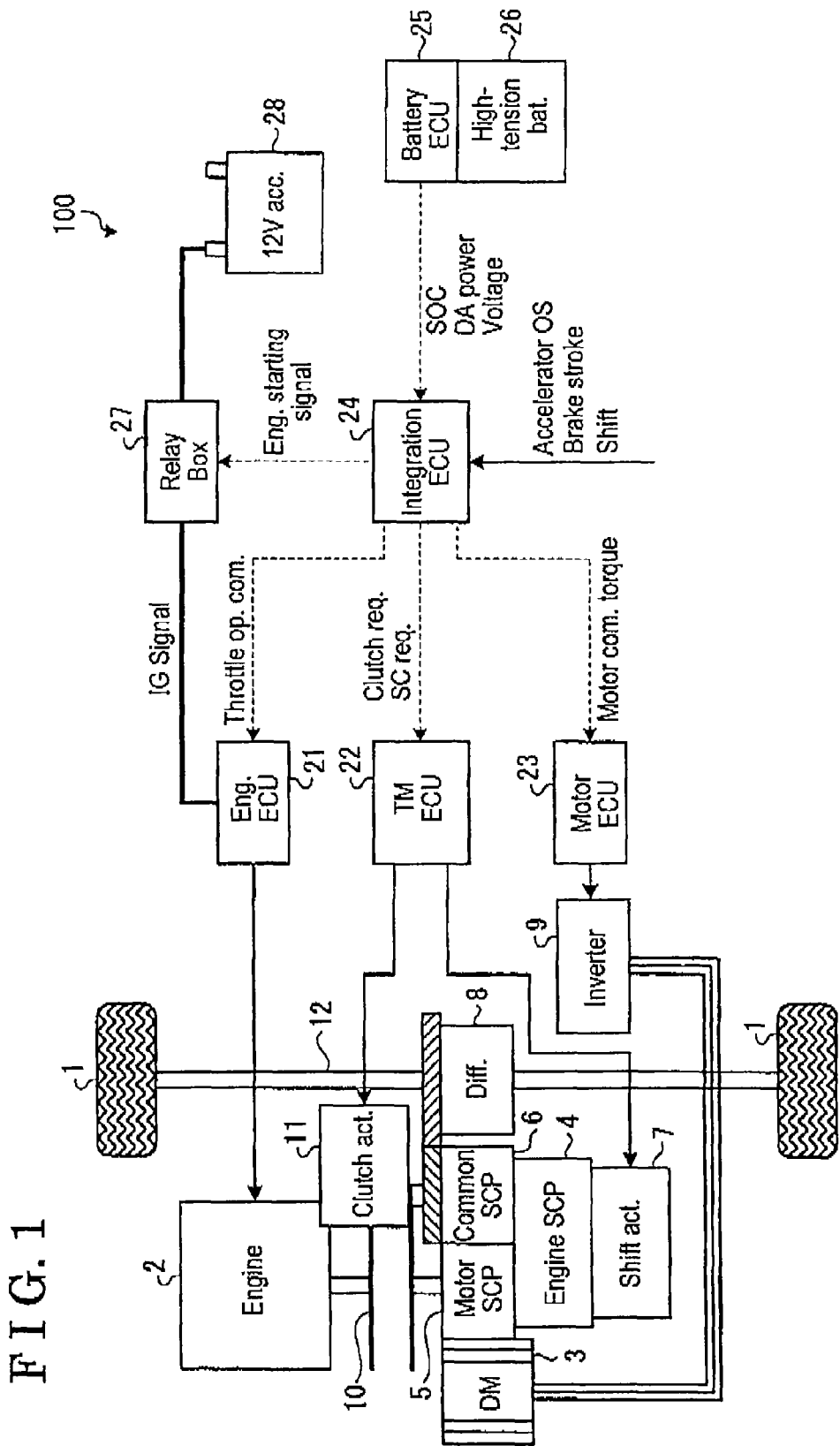
FIG. 1 shows a vehicle drive force transmission system for a vehicle according to an embodiment disclosed here.

As illustrated in FIG. 1, a vehicle 100 of the embodiment corresponds to a hybrid vehicle which includes plural drive sources. As illustrated in FIG. 1, the vehicle 100 serves as a drive source for driving wheels of wheels 1. The vehicle 100 includes an engine 2 for independently controlling engine output in response to an accelerator pedal operation, a drive motor (also referred to as DM) 3 assisting a torque of the engine 2, and an inverter 9 supplying the electric power to the drive motor 3.

The vehicle drive force transmission system (drive force control system) of the vehicle 100 includes an engine speed change portion (also referred to as engine SCP) 4, a motor speed change portion (also referred to as motor SCP) 5, and a common speed change portion (also referred to as common SCP) 6. The engine speed change portion 4 accelerates and decelerates the vehicle 100 by switching rotation directions of the engine 2 to a forward direction and a rearward direction. The motor speed change portion 5 accelerates and decelerates the vehicle 100 by switching rotation directions of the drive motor 3 to a forward direction and a rearward direction. The common speed change portion 6 transmits a rotation torque transmitted from the engine speed change portion 4 and the motor speed change portion 5 to a differential gear (also referred to as diff.) 8.

Further, the vehicle 100 includes a shift actuator (also referred to as shift act.) 7 and the differential gear 8. The shift actuator 7 is operated when changing speed at each of the engine speed change portion 4, the motor speed change portion 5, and the common speed change portion 6. The differential gear 8 generates differential motions between the left-hand wheel and the right-hand wheel when transmitting the rotation torque transmitted from the common speed change portion 6 to the wheels 1.

The engine speed change portion 4, the motor speed change portion 5, and the common speed change portion 6 are the mechanisms for transmitting the torque outputted from the drive motor 3 and the engine 2 to the driving wheels of wheels 1 via a drive shaft (the differential gear 8 and a drive shaft 12). The motor speed change portion 5 is a mechanism that accelerates and decelerates the vehicle 100 by switching rotation directions of the rotation torque outputted from the drive motor 3 to the forward and the rearward directions.

The engine speed change portion 4 is the mechanism that accelerates and decelerates the vehicle 100 by switching rotation directions of the rotation torque outputted from an engine output shaft of the engine 2 to the forward and rearward directions. The common speed change portion 6 is the mechanism that transmits the rotation torque transmitted from the drive motor 3 and the engine 2 to the driving wheels of wheels 1 via the drive shaft (differential gear 8 and the drive shaft 12). Each of the engine speed change portion 4, motor speed change portion 5, and the common speed change portion 6 is configured to switch plural gear stages, or gear ranges. The shift actuator 7 controls switching of the gear stages, or gear ranges of the engine speed change portion 4, motor speed change portion 5, and the common speed change portion 6.

Further, the vehicle drive force transmission system of the vehicle 100 of the embodiment includes a clutch 10 for the engine 2 and a clutch actuator (also referred to as clutch act.) 11 for actuating the clutch 10.

The clutch 10 is controlled to connect and disconnect by the clutch actuator 11 which is controlled to actuate by a transmission ECU 22.

Plural electronic control units (ECUs) are provided for controlling each components of the vehicle drive force transmission system of the vehicle 100. The vehicle drive force transmission system of the vehicle 100 according to the embodiment includes an engine ECU (also referred to as eng. ECU) 21, the transmission ECU (also referred to as TM ECU) 22, a motor ECU 23, an integration ECU (i.e., serving as a control portion) 24, and a battery ECU 25. The embodiment shows an example of arrangements of the ECUs and other arrangements are applicable. For example, alternatively, all of the controls that are performed by the aforementioned plural ECUs may be performed by a single ECU. The vehicle drive force transmission system of the vehicle 100 of the embodiment includes a high-tension battery (also referred to as high-tension bat.) 26, a relay box 27, and 12V accessories (also referred to as 12V acc.) 28.

The battery ECU 25 controls the high-tension battery 26 and sends the information associated with the battery (e.g., State of Charge (SOC), discharge allowable power (also referred to as DA power), electric voltage (also referred to as voltage)) to the integration ECU 24.

The integration ECU 24 controls each of the ECUs. The integration ECU 24 of the embodiment sends various commands to other ECUs on the basis of inputted various signals (e.g., the information related to the battery, operation state of the accelerator (also referred to as accelerator operation state, or accelerator OS), brake stroke, and a shift). An operation amount of the accelerator pedal, for example, is applied as the operation state of the accelerator. However, the operation state of the accelerator is not limited to the operation amount of the accelerator pedal, and anything associated with degrees of the operation related to the accelerator is applicable.

For example, the integration ECU 24 sends a throttle opening command (also referred to as throttle op. com.) based on the operation state of the accelerator to the engine ECU 21, sends a request for clutch engagement and disengagement (also referred to as clutch request, or clutch req.) and a request for speed change (also referred to as SC req.) to the transmission ECU 22, and sends a command associated with the torque to the motor ECU 23 (also referred to as motor command torque, or motor com. torque).

The engine ECU 21 is connected to the 12V accessories 28 via the relay box 27, receives the IG signal, and controls the engine 2 in response to a command from the integration ECU 24.

The transmission ECU 22 controls the clutch actuator 11 and the shift actuator 7 in accordance with a request from the integration ECU 24.

The motor ECU 23 controls the inverter 9 in response to a command from the integration ECU 24 thus to control the drive motor 3 that is connected to the inverter 9.

Figure 2:
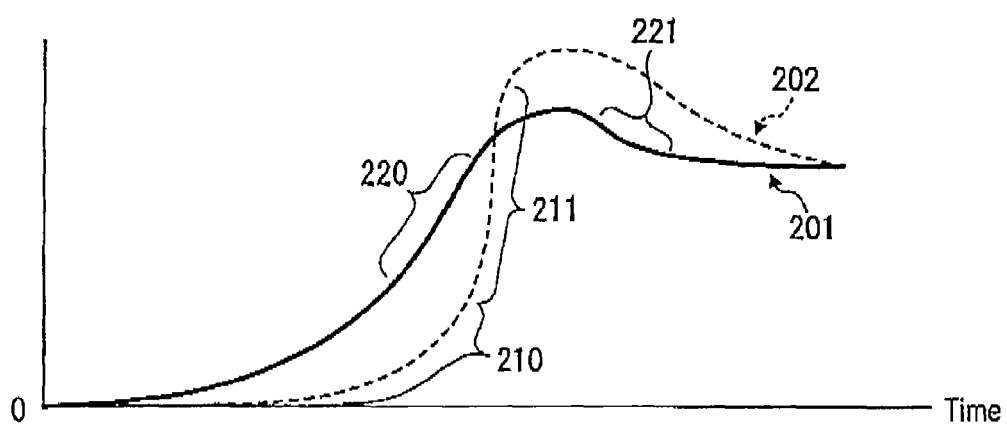
FIG. 2 shows a relationship between an engine output and changes in an operation state of an accelerator according to a known device.

FIG. 2 shows a relationship between an engine output and changes in an operation state of the accelerator according to the known device. In FIG. 2, a line 201 shows changes in the operation state of the accelerator (an accelerator pedal operation amount). A line 202 in FIG. 2 shows a drive force of the engine. According to an example shown in FIG. 2, by an operation of the accelerator pedal by the driver as indicated with the line 201, a throttle opening of the engine gradually increases in response to the degree of the accelerator pedal operation amount, thus to generate the drive force of the engine. However, as indicated with a period 210 in FIG. 2, a rise of the drive force of the engine delays. With such rise, significant length of time is needed to achieve the acceleration and vehicle speed that the driver desires. Consequently, the driver considers that the operation amount of the accelerator pedal is insufficient because the desired acceleration cannot be obtained, and increases the operation amount of the accelerator pedal as indicated with a period 220 in FIG. 2 so that an operation to further increase the amount of change, or the variation of the throttle opening is performed. In those circumstances, because the throttle opening is further increased in a state where the delay of the rise is dissolving, as indicated with a period 211 in FIG. 2, the drive force of the engine rises sharply, or steeply. With such sharp rise, the acceleration and the vehicle speed greater than the driver expected may generate, and in those circumstances, as indicated with a period 221 in FIG. 2, the driver reduces the operation amount of the accelerator pedal so that an operation to reduce the throttle opening is performed. Accordingly, the drive force of the engine is reduced.

This is based on that the acceleration is determined in accordance with the operation state of the accelerator. That is, the compensation of the acceleration to achieve the targeted acceleration which is in accordance with the operation state of the accelerator causes a delay until the driver feels that the vehicle is sufficiently accelerated. Such delay is generated because the driver unlikely registers, or grasps a moderate change in the acceleration.

According to the above described known device, when the driver feels that a rise of the engine output of the vehicle is delayed, the driver may further operate the accelerator pedal.

In other words, the accelerator may be excessively operated. In those circumstances, in a case where the vehicle speed faster than the driver expected generates, an operation to reduce the vehicle speed, for example, by reducing the operation amount of the accelerator pedal may be performed. In such case, an engine output is wasted.

According to the construction of the embodiment, an advancing compensation control by the drive motor 3 is performed on the basis of the amount of change of the operation state of the accelerator when the accelerator is operated, in other words, when the operation state of the accelerator is changing. The advancing compensation control is a control for increasing the drive force.

Figure 3:
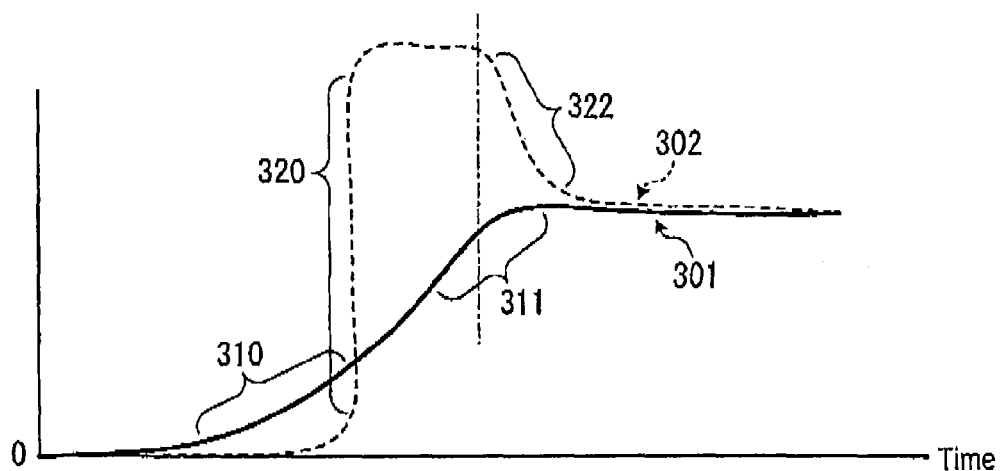
FIG. 3 shows a relationship between an engine output and changes in an operation state of an accelerator of a vehicle according to the embodiment disclosed here.

FIG. 3 shows a relationship between changes in the operation state of the accelerator (changes in operation amount of the accelerator pedal) and the drive force of the engine 2. In FIG. 3, a line 301 shows changes in the operation state of the accelerator and a line 302 shows the drive force of the engine. According to an example shown in FIG. 3, as indicated with a period 310 of the line 301, the operation state of the accelerator (the operation amount of the accelerator pedal) gradually increases to make the vehicle 100 travel when starting the vehicle 100 which is in a stopped state. According to the construction of the embodiment, the drive force is sharply, or steeply raised (the drive force rockets) by performing the advancing compensation control by the drive motor 3 together with the drive control of the engine 2 on the basis of the amount of change of the operation state of the accelerator (the operation amount of the accelerator pedal) as indicated with a period 320. Accordingly, the vehicle 100 can obtain large acceleration in a short period. Then, in a case where the driver is satisfied with the acceleration, as indicated with a period 311, the driver stops further operating the accelerator pedal and maintains the operation state of the accelerator (maintains the operation state of the accelerator pedal). In response to the changes in the operation state of the accelerator at the period 311, the advancing compensation by the drive motor 3 is gradually reduced to stop and the drive control is transited to the drive control only by the engine 2 (period 322). Thus, according to the vehicle 100, after performing the advancing compensation by the drive motor 3 in addition to the drive control of the engine 2, the advancing compensation by the drive motor 3 is stopped and returns to perform a control to attain the drive force of the engine 2 in accordance with the operation state of the accelerator pedal.

According to the embodiment, unnecessary additional operation of the accelerator pedal is restricted from being performed. Further, by sharply, or steeply rising (rocketing) the drive force, the driver can have the appropriate acceleration feeling.

Before explaining the construction of the vehicle 100 in detail, a relationship between a drive force F and the acceleration a of the vehicle will be explained. Equation 1 is an equation for calculating the drive force F. Variable m corresponds to vehicle weight.

$$F = m * a \qquad \text{[Equation 1]}$$

As expressed in Equation 1, the drive force F is proportional to the vehicle acceleration a. Next, a relationship between the speed v and the acceleration a will be explained. Equation 2 is an equation for calculating the speed v. In those circumstances, variable t corresponds to an elapsed time.

$$v = a * t \qquad \text{[Equation 2]}$$

Figure 4:
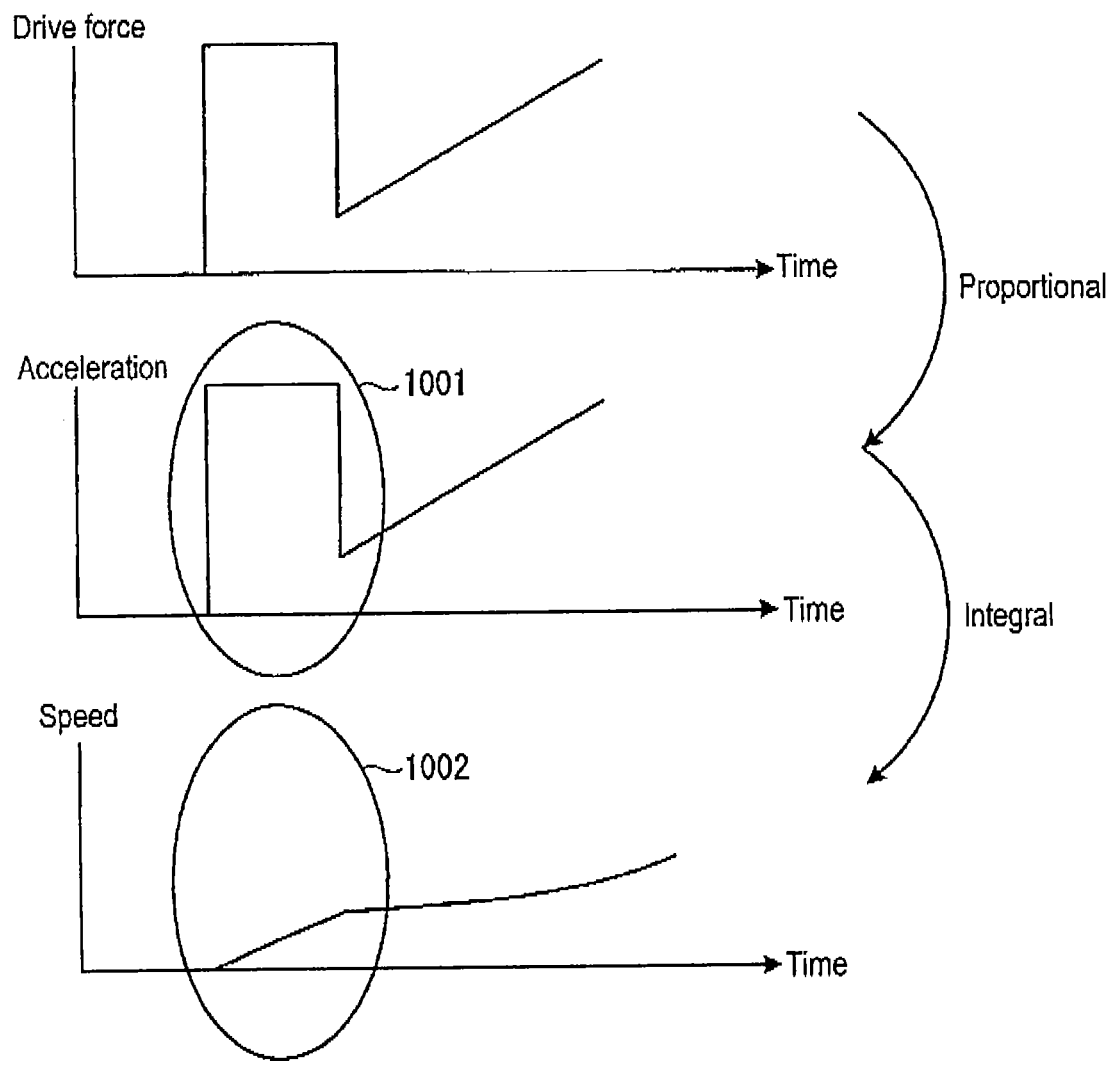
FIG. 4 shows changes in drive force, acceleration, and an increment of speed in accordance with an elapse of time.

The relationship shown in FIG. 4 is obtained from Equation 1 and Equation 2. FIG. 4 shows the drive force, the acceleration, and the increments, or increasing rate of the speed in response to the elapse of time. In case the drive force increases in accordance with the elapse of time in FIG. 4, the acceleration increases being proportional to the drive force. When the acceleration increases as illustrated in FIG. 4, the speed corresponding to the integrated value of the acceleration is increased. That is, even if the acceleration sharply increases as indicated with a period 1001 in FIG. 4, the speed does not increase sharply as indicated with a period 1002 in FIG. 4. However, by increasing the acceleration sharply for a moment (momentarily), it is possible to make the driver recognize that the vehicle starts accelerating. Thus, according to the embodiment, the acceleration feeling that the user recognizes is enhanced by instantaneously (momentarily) increasing the acceleration. Further, according to the embodiment, because the speed does not change sharply while the acceleration feeling is enhanced, the safety can be ensured. Next, a construction for performing the control explained above according to the embodiment will be explained as follows.

Figure 5:
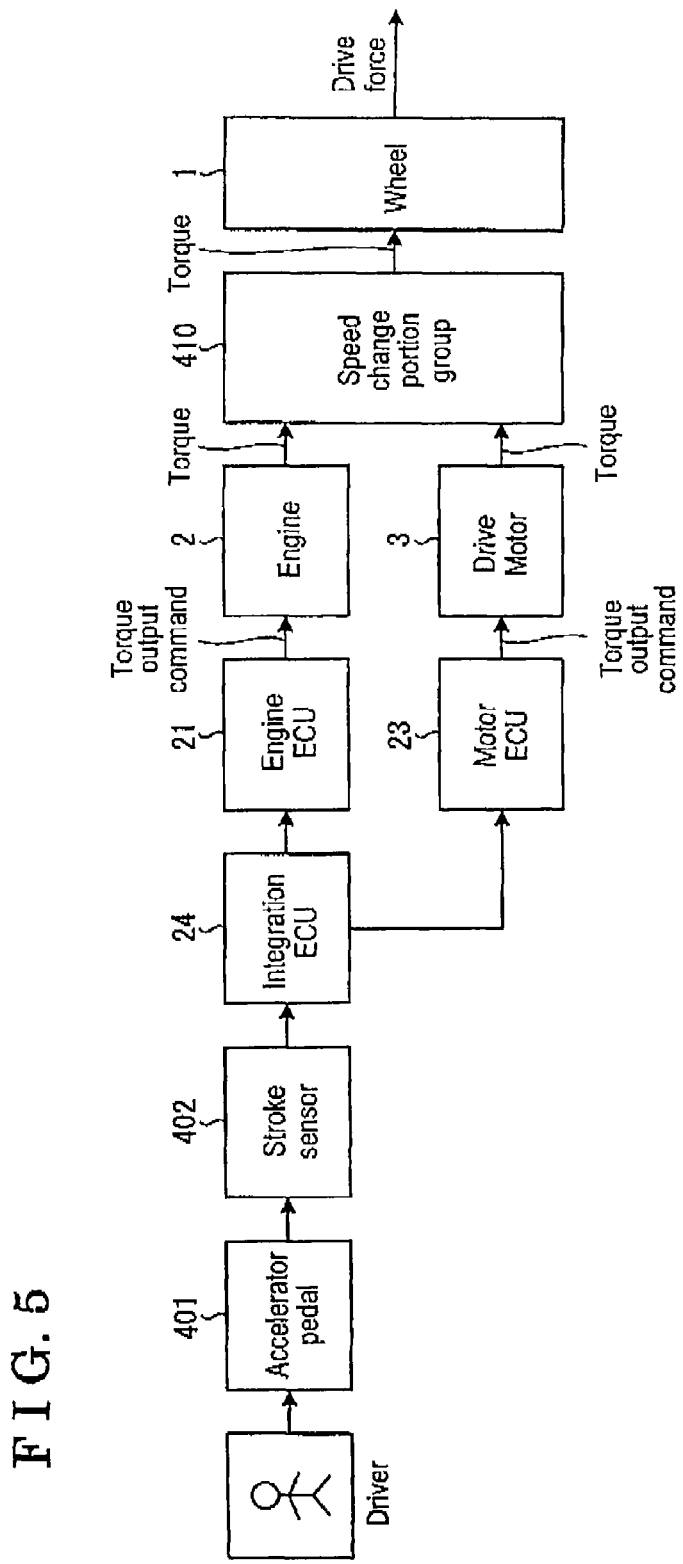
FIG. 5 shows a diagram for performing a drive control in accordance with the operation state of the accelerator of the vehicle according to the embodiment disclosed here.

FIG. 5 shows a construction for performing the drive control in accordance with the operation state of the accelerator. As illustrated in FIG. 5, the drive control is started by the driver pressing the accelerator pedal (i.e., serving as an accelerator) 401 in response to an accelerator request by the driver for moving the vehicle 100.

The accelerator pedal 401 is provided at a position where the driver can press, or step on in the vehicle 100. A stroke sensor (i.e., serving as an operation state detection portion) 402 detects an operation amount of the accelerator pedal 401 (operation state of the accelerator). In other words, the stroke sensor 402 serves as an operation state detection portion detecting the operation state of the accelerator of the vehicle.

The integration ECU 24 performs the control to increase the acceleration compared to the case where the operation state of the accelerator is maintained, that is, the integration ECU 24 increases the acceleration by performing the advancing compensation control by the drive motor 3 together with the drive control of the engine 2 on the basis of the amount of change of the operation state of the accelerator in a case where the amount of change of the operation state of the accelerator (accelerator pedal operation amount) detected by the stroke sensor 402 in accordance with the elapse of the time increases when starting the vehicle 100. In other words, the integration ECU 24 serves as a control portion for performing the advancing compensation control.

In those circumstances, the integration ECU 24 performs the drive control of the engine 2 and the advancing compensation control by the drive motor 3 when the amount of change of the operation state of the accelerator (acceleration pedal operation amount) detected by the stroke sensor 402 is greater than a predetermined value. Further, the integration ECU 24 performs the drive control of the engine 2 when the amount of change of the operation state of the accelerator (acceleration pedal operation amount) detected by the stroke sensor 402 is equal to or smaller than the predetermined value, and the advancing compensation control by the drive motor 3 may be restricted. The predetermined value is set appropriately for the embodiment. The explanation for the predetermined value is omitted here.

The integration ECU 24 according to the embodiment calculates the drive force that serves as target on the basis of the amount of change of the operation state of the accelerator, and distributes the torque of the calculated drive force to the engine ECU 21 and the motor ECU 23. Then, the integration ECU 24 requests the engine ECU 21 and the motor ECU 23 to output the each distributed torque. For example, particularly, the integration ECU 24 requests the engine ECU 21 to output the drive force (torque) in response to the operation state of the accelerator similar to during the traveling state of the vehicle. On the other hand, the integration ECU 24, for example, requests the motor ECU 23 to output a differential torque between the calculated target drive force (torque) and the torque requested to the engine ECU 21. Particular calculation method for the torque by the integration ECU 24 will be explained hereinafter.

The engine ECU 21 commands the engine 2 to output the torque in accordance with the request from the integration ECU 24. Thus, the engine 2 outputs the toque in accordance with the output command of the torque to the engine 2 from the engine ECU 21.

The motor ECU 23 commands the drive motor 3 to output the toque in accordance with the request from the integration ECU 24. Thus, the drive motor 3 outputs the torque in accordance with the output command of the torque to the drive motor 3 from the motor ECU 23.

A speed change portion group 410 (the motor speed change portion 5, the engine speed change portion 4, and the common speed change portion 6) transmits the torque outputted from the engine 2 and the torque outputted from the drive motor 3 to the wheels 1. Thus, the drive force is generated at the wheels 1.

Figure 6:
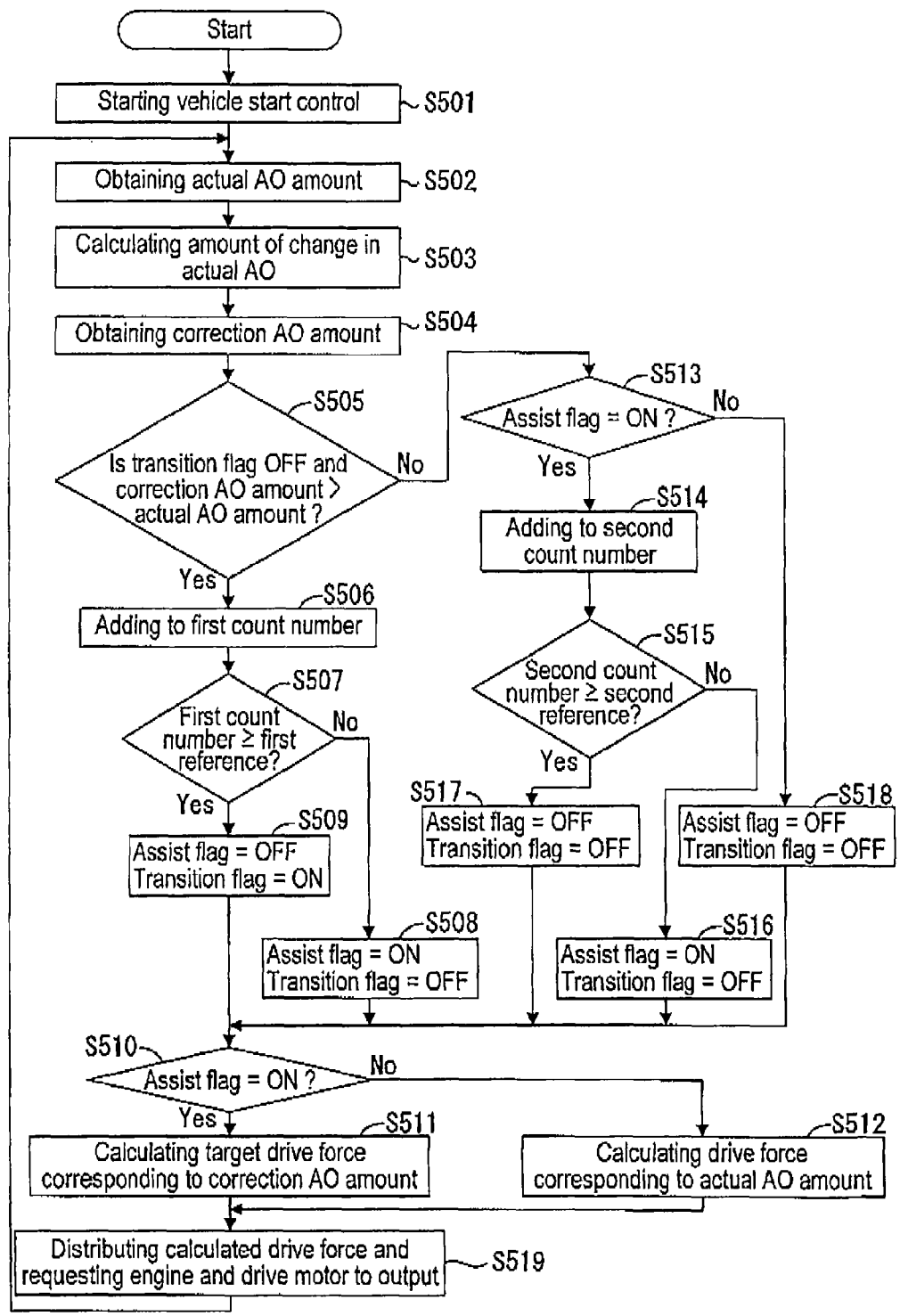
FIG. 6 is a flowchart showing a procedure of transactions until performing an output request of a torque for outputting a torque for the vehicle according to the embodiment disclosed here.

Transactions until performing the output request of the torque at the vehicle 100 according to the embodiment will be explained as follows. FIG. 6 is a flowchart showing the procedure of the transactions explained above at the vehicle 100 according to the embodiment.

First, in response to the operation of the accelerator pedal 401 by the driver, the integration ECU 24 starts the control for starting the vehicle 100 (starting vehicle start control) (Step S501).

The integration ECU 24 obtains the operation state of the accelerator that is detected by the stroke sensor 402, that is, the detected operation amount of the accelerator pedal (hereinafter, referred to as the actual accelerator operation amount, or actual AO amount in the flowchart) (Step S502).

The integration ECU 24 calculates the amount of change of the operation amount of the accelerator pedal 401 by the driver (amount of change θ in actual accelerator operation, also referred to as amount of change in actual AO) on the basis of the obtained actual accelerator operation amount (Step S503).

Calculation method for the amount of change θ in actual accelerator operation will be explained hereinafter. First, the integration ECU 24 calculates the actual accelerator operation deviation by Equation 3. The actual accelerator operation deviation is considered corresponding to the acceleration.

Actual accelerator operation deviation=Currently detected actual accelerator operation amount− Previously detected actual accelerator operation amount [Equation 3]

The integration ECU 24 calculates the amount of change θ in actual accelerator operation by dividing the calculated actual accelerator operation deviation by time that is detection interval of the actual accelerator operation amount (Step S503).

Thereafter, the integration ECU 24 obtains a correction accelerator operation amount (also referred to as correction AO amount) corresponding to the calculated amount of change θ in actual accelerator operation (Step S504). The correction accelerator operation amount is a value different from the operation amount of the accelerator pedal 401 by the driver (operation amount of the accelerator pedal), and is the value predetermined in order to perform the advancing compensation control in accordance with the amount of change of the operation amount of the accelerator pedal.

Figure 7:
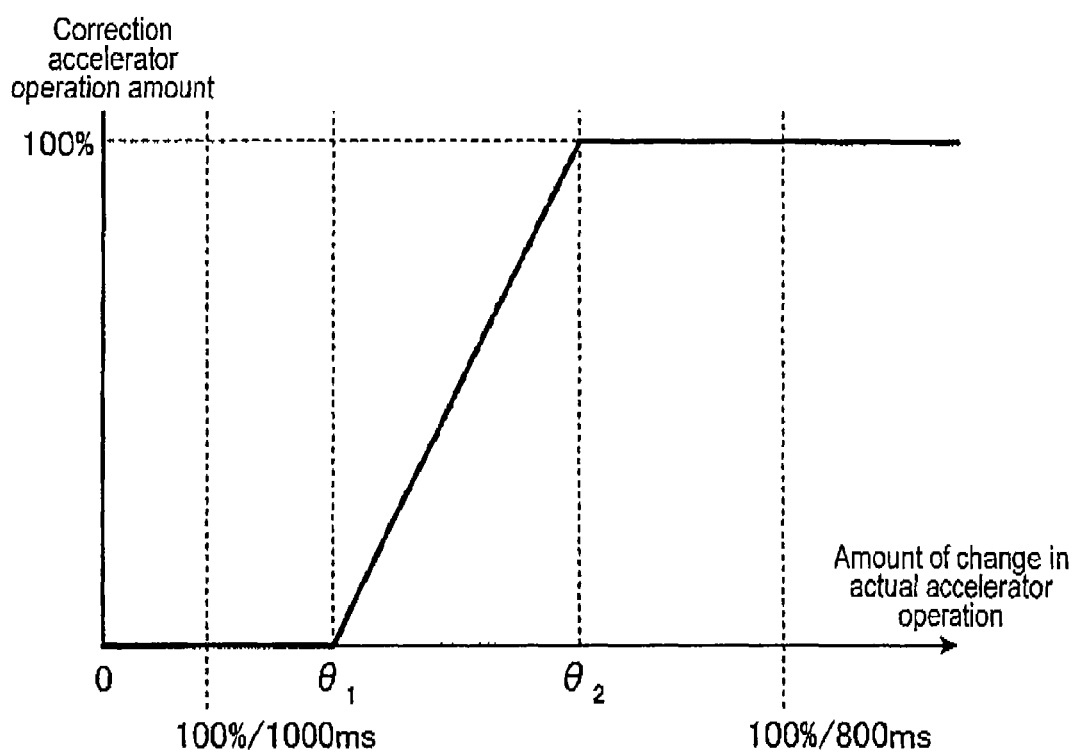
FIG. 7 shows a relationship between amount of change in actual accelerator pedal operation and a correction accelerator operation amount.

Calculation method of the correction accelerator operation amount will be explained hereinafter. According to the integration ECU 24 of the embodiment, the relationship of the amount of change in actual accelerator operation and the correction accelerator operation amount is stored in a ROM. FIG. 7 shows the relationship between the amount of change in actual accelerator operation and the correction accelerator operation amount. As illustrated in FIG. 7, the correction accelerator operation amount changes from 0% (amount of change θ1) to 100% (amount of change θ2) between the amounts of change in actual accelerator operation "100%/1000 ms" and "100%/800 ms."

The integration ECU 24 according to the embodiment obtains the correction accelerator operation amount from the amount of change θ in actual accelerator operation referring to the relationship shown in FIG. 7. Then, the integration ECU 24 performs the drive control of the engine 2 and the advancing compensation control by the drive motor 3 on the basis of the correction accelerator operation amount, the drive force control corresponding to the amount of change θ in actual accelerator operation can be achieved.

As shown in FIG. 6, the integration ECU 24 determines whether transition flag is OFF (transition flag=OFF) and whether the correction accelerator operation amount is greater than the actual accelerator operation amount (correction accelerator operation amount>actual accelerator operation amount) (Step S505). As a default value, the transition flag is set as "OFF." According to the embodiment, after a first count number of times is assumed to be equal to or greater than a first reference value, the transaction does not re-transit to Step S608 and the transaction transits, or advances to Steps S513 to S517. The transition flag is applied for this purpose. That is, when the transition flag is ON, the transaction transits, or advances to Steps S513 to S517.

In a case where it is determined that the transition flag is OFF and the correction accelerator operation amount is greater than the actual accelerator operation amount (Yes at Step S505), the integration ECU 24 adds a predetermined value to the first count number of times (adding to first count number) (Step S506). The first count number of times and the predetermined value are determined according to the embodiment, and the explanation here is omitted.

Thereafter, the integration ECU 24 determines whether the first count number of times is equal to or greater than the first reference value (whether first count number first reference) (Step S507). The first reference value corresponds to a value that is the period (term, limit) for performing the advancing compensation control by the drive motor 3.

When the integration ECU 24 determines that the first count number of times is less than the first reference value (No at Step S507), the integration ECU 24 sets an assist flag as ON and the transition flag as OFF in order to perform the advancing compensation control (Step S508).

On the other hand, when the integration ECU 24 determines that the first count number of times is equal to or greater than the first reference value (Yes at Step S507), it is determined that the period for performing the advancing compensation control is ended, and the integration ECU 24 sets the assist flag as OFF and the transition flag as ON (Step S509).

Thereafter, the integration ECU 24 determines whether the assist flag is ON (Step S510). When the integration ECU 24 determines that the assist flag is ON (Yes at Step S510), the target drive force corresponding to the correction accelerator operation amount is calculated (Step S511). The calculated target drive force is distributed to the engine 2 and the drive motor 3.

On the other hand, when it is determined that the assist flag is OFF (No at Step S510), the drive force corresponding to the actual accelerator operation amount is calculated (Step S512). The calculated drive force is distributed to at least one of the engine 2 and the drive motor 3.

Further, when the integration ECU 24 determines that the transition flag is not OFF or that the correction accelerator operation amount is equal to or less than the actual accelerator operation amount (correction accelerator operation amount≤actual accelerator operation amount) (No at Step S505), the integration ECU 24 further determines whether the assist flag is ON (assist flag=ON) (Step S513). In a case where the integration ECU 24 determines that the assist flag is ON (assist flag=ON) (Yes at Step S513), the integration ECU 24 adds a predetermined value to a second count number of times (adding to second count number) (Step S514). The second count number of times is determined according to the embodiment, and the explanation is omitted here.

Thereafter, the integration ECU 24 determines whether the second count number of times is equal to or greater than a second reference value (whether second count number≥second reference) (Step S515). The second reference value is defined as a period (term, limit) for performing the advancing compensation control after the actual accelerator operation amount is assumed to be equal to or greater than the correction accelerator operation amount.

When the integration ECU 24 determines that the second count number of times is smaller than the second reference value (No at Step S515), the integration ECU 24 sets ON at the assist flag and sets OFF at the transition flag (Step S516).

On the other hand, when the integration ECU 24 determines that the second count number of times is equal to or greater than the second reference value (Yes at Step S515), the integration ECU 24 sets OFF at the assist flag and sets OFF at the transition flag (Step S517).

Thereafter, similar to the above-explained transaction, transactions of Steps S510 to S512 are performed.

On the other hand, when the integration ECU 24 determines that the assist flag is OFF (assist flag=OFF) at Step S513 (No at Step S513), the assist flag is set as OFF and the transition flag is set as OFF (Step S518), and the transactions of Steps S510 to S512 are performed similarly to the above-explained transactions.

After the drive force is calculated by the above-explained transactions, the integration ECU 24 distributes the calculated drive force to the engine 2 and the drive motor 3 to request at least one of the engine 2 and the drive motor 3 to output the drive force (performing output request) (Step S519). Thereafter, the transaction starts from Step S502.

According to the embodiment, in accordance with the above-explained procedure, the drive force corresponding to the amount of change in the operation of the accelerator pedal 401 is outputted. Next, the relationships of the actual accelerator operation amount, which corresponds to the operation state of the accelerator, and the drive force, for example, will be explained hereinafter.

Figure 8:
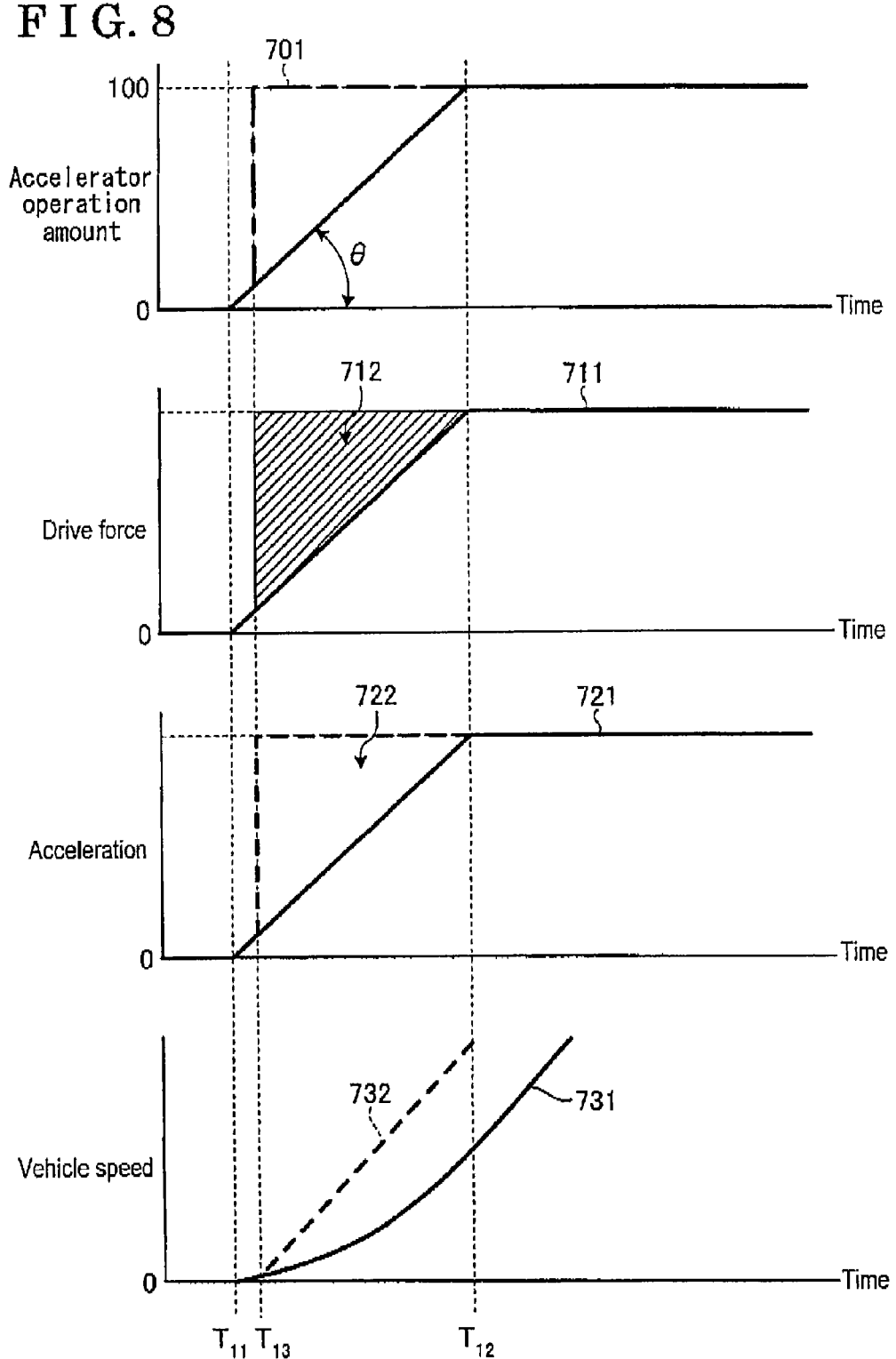
FIG. 8 shows a first example of transitions of drive force, acceleration, and vehicle speed on the basis of the operation state of the accelerator of the vehicle according to the embodiment disclosed here.

FIG. 8 shows a first example of the transitions of the drive force, which is based on the actual accelerator operation amount, of the acceleration, and of the vehicle speed. First graph in FIG. 8 shows the first example of the transition of the actual accelerator operation amount based on the elapse of time. As illustrated in FIG. 8, the actual accelerator operation amount is 0% at time $T_{11}$, and is assumed to be 100% at time $T_{12}$. The actual accelerator operation amount linearly increases from time $T_{11}$ to time $T_{12}$. The amount of change in the actual accelerator operation amount by the accelerator pedal 401 is expressed as angle θ.

According to the embodiment, the integration ECU 24 can calculate the amount of change of the presently detected actual accelerator operation amount relative to the previously detected actual accelerator operation amount at time $T_{13}$. According to the example shown in FIG. 8, the integration ECU 24 obtains 100% of correction accelerator operation amount corresponding to the amount of change in the actual accelerator operation amount. A dotted chain line 701 in FIG. 8 indicates the obtained correction accelerator operation amount.

Accordingly, the integration ECU 24 requests the engine 2 and the drive motor 3 to output the drive force corresponding to the correction accelerator operation amount.

Second graph in FIG. 8 shows the drive force that the engine 2 and the drive motor 3 output. According to the embodiment, a line 711 in FIG. 8 indicates the transition of the drive force that the engine 2 outputs in response to the actual accelerator operation amount. A region 712 in FIG. 8 shows the drive force by the advancing compensation control of the drive motor 3. Thus, the drive force sharply, or steeply rises (the drive force rockets) up to a value corresponding to the 100% of actual accelerator operation amount at time $T_{13}$. According to the embodiment, the drive force corresponding to the actual accelerator operation amount among the drive force corresponding to the amount of change in the actual accelerator operation amount is distributed to the engine 2 and the rest of the drive force is distributed to the drive motor 3. Then, the advancing compensation ends when the correction accelerator operation amount, which is obtained from the amount of change in the actual accelerator operation amount, and the actual accelerator operation amount accord to each other (time $T_{12}$).

Third graph in FIG. 8 shows changes in the acceleration of the vehicle 100 on the basis of the advancing compensation control of the drive motor 3 and the drive control of the engine 2. A line 721 in FIG. 8 indicates the transition of the acceleration corresponding to the drive force of the engine 2. A region 722 indicates the transition of the acceleration corresponding to the drive force of the drive motor 3.

Fourth graph in FIG. 8 shows the transition of the vehicle speed of the vehicle 100. A line 731 in FIG. 8 indicates the transition of the vehicle speed in a case where the engine 2 only is driven without the advancing compensation control by the drive motor 3 (i.e., the case only with the acceleration indicated with the line 721 in FIG. 8). In other words, the line 731 shows the transition of the vehicle speed of the known vehicle. On the other hand, a line 732 indicates the transition of the vehicle speed accompanied with (in response to) the advancing compensation control by the drive motor 3 and the drive control by the engine 2 (i.e., the acceleration that is indicated with the combination of the line 721 and the region 722 in FIG. 8).

According to the example shown in FIG. 8, it is confirmed that the vehicle speed of the vehicle 100 increases earlier, or fast by the advancing compensation control of the drive motor 3. In those circumstances, as shown in FIG. 8, the line 731 and the line 732 are eventually assumed to be parallel to each other because the accelerations accord to each other.

Figure 9:
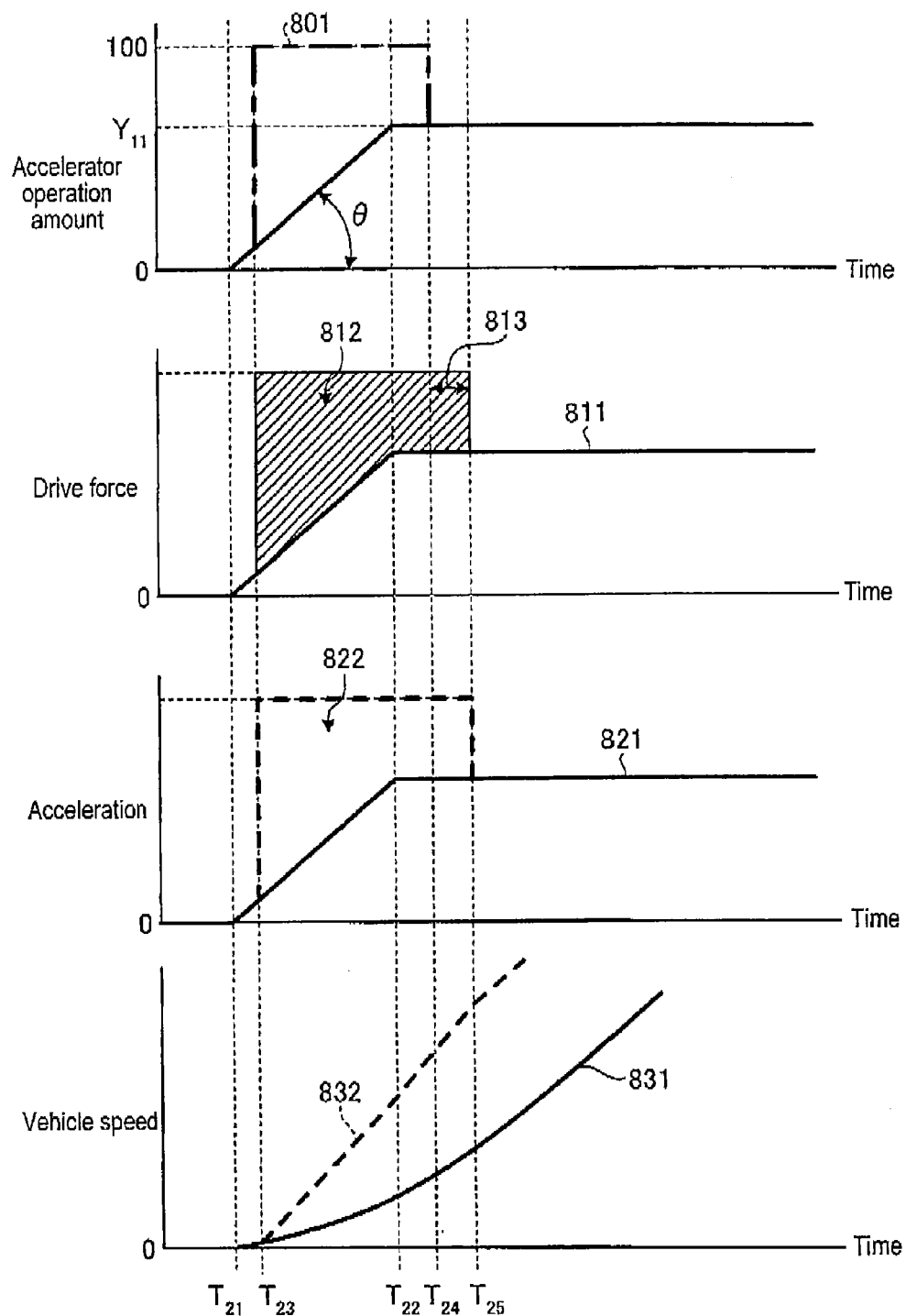
FIG. 9 shows a second example of transitions of drive force, acceleration, and vehicle speed on the basis of the operation state of the accelerator of the vehicle according to the embodiment disclosed here.

FIG. 9 shows a second example of the transition of the vehicle speed, the acceleration, and the drive force based on the actual accelerator operation amount. First graph in FIG. 9 shows the second example of the transition of the actual accelerator operation amount based on the elapse of time. According to the example shown in FIG. 9, the actual accelerator operation amount is 0% at time $T_{21}$ and has a predetermined value Y11 (percentage) which is less than 100% at time $T_{22}$. The actual accelerator operation amount linearly increases from time $T_{21}$ to time $T_{22}$. In FIG. 9, the amount of change in the operation of the accelerator pedal 401 is expressed with angle θ.

According to the embodiment, the integration ECU 24 can calculate the amount of change of the presently detected actual accelerator operation amount relative to the previously detected actual accelerator operation amount. In those circumstances, the integration ECU 24 obtains 100% of the correction accelerator operation amount corresponding to the amount of change in the actual accelerator operation amount. A dotted chain line 801 in FIG. 9 indicates the obtained correction accelerator operation amount.

Further, the integration ECU 24 calculates the amount of change of the presently detected actual accelerator operation amount relative to the previously detected actual accelerator operation amount (e.g., the actual accelerator operation amount detected at time $T_{22}$) at time $T_{24}$. Because the amount of change, or variation is assumed to be zero (0) at time $T_{24}$, the correction accelerator operation amount is assumed to be zero (0). In other words, the actual accelerator operation amount is assumed to be equal to or greater than the correction accelerator operation amount (the correction accelerator operation amount≤actual accelerator operation amount).

The integration ECU 24 requests the engine 2 and the drive motor 3 to output the drive force in accordance with the correction accelerator operation amount and the actual accelerator operation amount.

Second graph in FIG. 9 shows the drive force that the engine 2 and the drive motor 3 output. According to the embodiment, a line 811 in FIG. 9 indicates the transition of the drive force that the engine 2 outputs. A region 812 indicates the drive force by the advancing compensation control of the drive motor 3 in accordance with (corresponding to) the amount of change in the actual accelerator operation amount. Thus, the drive force sharply, or steeply rises up to the value corresponding to 100% of the actual accelerator operation amount at time $T_{23}$. Thereafter, because the actual accelerator operation amount does not reach 100%, the advancing compensation control is ended at time $T_{25}$ by which a specified time 813 elapses from time $T_{24}$ at which the amount of change in the actual accelerator operation amount is assumed to be zero (0). The specified time 813 is a period corresponding to the second reference value in Step S515 shown in FIG. 6.

Third graph in FIG. 9 shows changes in the acceleration of the vehicle 100 by at least one of the drive control of the engine 2 and the advancing compensation control of the drive motor 3. A line 821 in FIG. 9 indicates the transition of the acceleration corresponding to the drive force of the engine 2. A region 822 in FIG. 9 indicates the acceleration corresponding to the drive force of the drive motor 3.

Fourth graph in FIG. 9 shows the transition of the vehicle speed of the vehicle 100. A line 831 in FIG. 9 indicates the transition of the vehicle speed in a case where the engine 2 only is driven without the advancing compensation control by the drive motor 3 (i.e., the case only with the acceleration indicated with the line 821 in FIG. 9). In other words, the line 831 shows the transition of the vehicle speed of the known vehicle. On the other hand, a line 832 indicates the transition of the vehicle speed accompanied with (in response to) the advancing compensation control by the drive motor 3 and the drive control by the engine 2 (i.e., the acceleration that is indicated with the combination of the line 821 and the region 822 in FIG. 9).

According to the example shown in FIG. 9, it is confirmed that the vehicle speed of the vehicle 100 increases earlier, or fast by the advancing compensation control by the drive motor 3. Further, as shown in FIG. 9, even if the actual accelerator operation amount does not increase to the expected level, because the advancing compensation control by the drive motor 3 can be attained by the integration ECU 24 until the specified time 813 elapses, comfortable acceleration for the driver can be attained.

Figure 10:
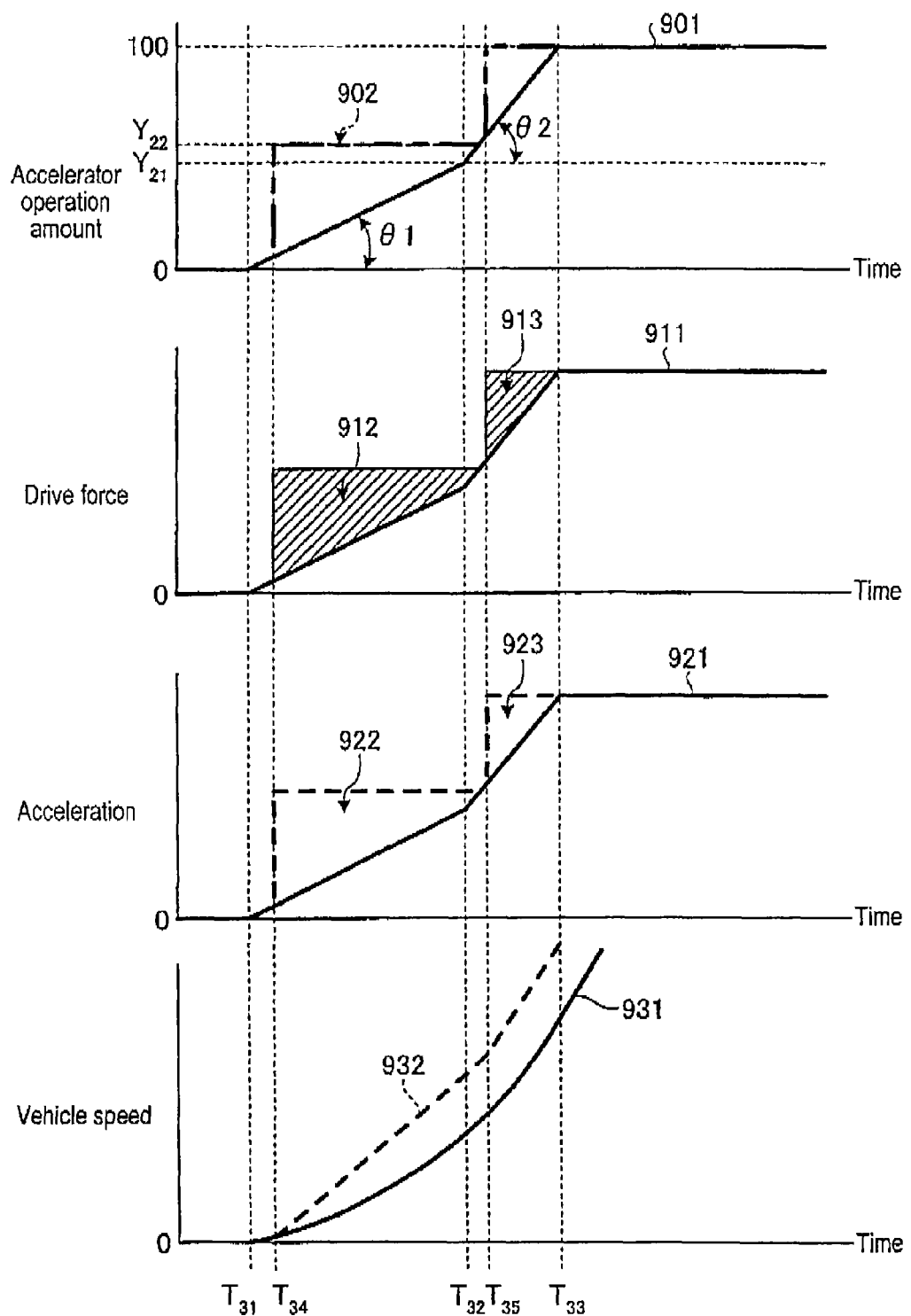
FIG. 10 shows a third example of transitions of drive force, acceleration, and vehicle speed on the basis of the operation state of the accelerator of the vehicle according to the embodiment disclosed here.

FIG. 10 shows a third example of the transition of the vehicle speed, the acceleration, and the drive force based on the actual accelerator operation amount. First graph in FIG. 10 shows the third example of the transition of the actual accelerator operation amount based on the elapse of time. A line 901 in FIG. 10 indicates the transition of the actual accelerator operation amount. In this example, after gradually operating the accelerator pedal 401 from time $T_{31}$ to time $T_{32}$ (until the operation amount of the accelerator pedal is assumed to be Y21%), the driver further operates the accelerator pedal 401 with greater level, or forcefully from time $T_{32}$ to $T_{33}$.

At time $T_{34}$, the integration ECU 24 can calculate an amount of change θ1 of the presently detected actual accelerator operation amount relative to the previously detected actual accelerator operation amount. The integration ECU 24 obtains the correction accelerator operation amount Y22% corresponding to the amount of change in the actual accelerator operation amount at time $T_{34}$ on the basis of the relationship shown in FIG. 7 and the calculation results. A dotted chain line 902 in FIG. 10 indicates the obtained correction accelerator operation amount. Thus, even in a case where the operation of the accelerator pedal 401 by the driver is moderate, the correction accelerator operation amount in accordance with the operation of the accelerator pedal is set.

After the accelerator pedal 401 is operated forcefully, or with greater level, at time $T_{35}$, an amount of change θ2 of the presently detected actual accelerator operation amount relative to the previously detected actual accelerator operation amount can be calculated. Here, the amount of change θ2 is greater than the amount of change θ1. The integration ECU 24 obtains 100% of correction accelerator operation amount corresponding to the amount of change in the actual accelerator operation amount at time $T_{35}$ on the basis of the calculation results.

The integration ECU 24 requests the engine 2 and the drive motor 3 to output the drive force in accordance with the correction accelerator operation amount and the actual accelerator operation amount.

Second graph in FIG. 10 shows the drive force that the engine 2 and the drive motor 3 output. According to the embodiment, a line 911 indicates the transition of the drive force that the engine 2 outputs. A region 912 in FIG. 10 indicates a drive force of the drive motor 3 corresponding to (in response to) the amount of change in the actual accelerator operation amount. Such drive force sharply, or steeply rises to the value corresponding to the Y22% of the actual accelerator operation amount at time $T_{34}$. Thereafter, because the accelerator pedal 401 is operated more forcefully, or with greater level, the integration ECU 24 calculates the amount of change θ2 of the accelerator operation amount to calculate 100% of the correction accelerator operation amount corresponding to the amount of change θ2. Accordingly, the advancing compensation control corresponding to the region 913 by the drive motor 3 is performed.

Thus, according to the embodiment, the advancing compensation control corresponding to the amount of change is performed irrespective of when the amount of change of the operation state of the accelerator (accelerator operation amount) generates. In addition to immediately after the vehicle 100 starts traveling, in a case where the operation amount of the accelerator pedal 401 changes, the advancing compensation control in response to the changes in the operation amount of the accelerator can be performed.

Third graph in FIG. 10 shows changes in the acceleration of the vehicle 100 by at least one of the drive control of the engine 2 and the advancing compensation control of the drive motor 3. According to the embodiment, a line 921 indicates the transition of the acceleration corresponding to the drive force of the engine 2. Regions 922, 923 in FIG. 10 indicate the acceleration corresponding to the drive force of the drive motor 3.

According to the embodiment, as shown in FIG. 10, the integration ECU 24 can perform the drive control of the engine 2 and the advancing compensation control by the drive motor 3 in a case where the amount of change in the actual accelerator operation amount changes to the second amount of change which differs from the first amount of change by the accelerator operation amount detected by the stroke sensor 402 after performing the drive control of the engine 2 and the advancing compensation control by the drive motor 3 until reaching a first target acceleration associated with the first amount of change in the actual accelerator operation amount in advance (i.e., until reaching a first target acceleration prebound with the first amount of change in the actual accelerator operation amount) so as to achieve a second target acceleration that is associated with the second amount of change in advance.

Fourth graph in FIG. 10 shows the transition of the vehicle speed of the vehicle 100. According to the embodiment, a line 931 indicates the transition of the vehicle speed in a case where the engine 2 only is driven without the advancing compensation control by the drive motor 3 (i.e., the case only with the acceleration indicated with the line 921 in FIG. 10). In other words, the line 931 shows the transition of the vehicle speed of the known vehicle. On the other hand, a line 932 indicates the transition of the vehicle speed accompanied with (in response to) the advancing compensation control by the drive motor 3 and the drive control by the engine 2 (i.e., the acceleration that is indicated with the combination of the line 921 and the regions 922, 923 in FIG. 10).

According to the example shown in FIG. 10, in addition to that the vehicle speed of the vehicle 100 increases earlier, or fast by the advancing compensation control of the drive motor 3, when the amount of change in the operation of the accelerator pedal 401 changes, the acceleration and the vehicle speed can be controlled in accordance with the changes.

According to a known device, or vehicle, the rise of the vehicle speed and the acceleration in response to the operation of the accelerator pedal is slow even if the accelerator pedal is operated. On the other hand, the drive force control system mounted to the vehicle 100 of the embodiment provides comfortable acceleration for the driver and occupant of the vehicle 100 by performing the drive control of the engine 2 and the advancing compensation control by the drive motor 3 so as to achieve the target acceleration that is determined on the basis of the amount of change of the actual operation state of the accelerator (actual accelerator operation amount).

Further, according to the embodiment, the integration ECU 24 restrains the advancing compensation control by the drive motor 3 after the predetermined time elapses after performing the control to achieve the target acceleration. Accordingly, when the operation state of the accelerator (the actual accelerator operation amount) changes, the acceleration can be controlled in accordance with the changed operation state of the accelerator (actual accelerator operation amount).

According to the construction of the above-described embodiment, irrespective of whether the vehicle 100 is in a stopped state or in a traveling state, the advancing compensation control is performed on the basis of the amount of change of the operation state of the accelerator (accelerator pedal operation amount). However, the construction is not limited. For example, alternatively, the degree of the advancing compensation control may be changed depending on whether the vehicle starts traveling from the stopped state or the vehicle is in a traveling state. According to a modified example of the embodiment, a degree of the advancing compensation control when the vehicle starts traveling from the stopped state and a degree of the advancing compensation control when the vehicle is in a traveling state are different.

When the stroke sensor 402 detects the operation of the accelerator pedal 401 and the vehicle 100 starts moving from the stopped state, the integration ECU 24 according to the modified example performs a torque assist by the drive motor 3 in addition to driving the engine 2 during an initial period (e.g., 20 seconds) from detecting the operation of the accelerator pedal 401 to perform the advancing compensation control to provide the greater initial acceleration at the start of the operation of the accelerator than the acceleration at a normal operation after the vehicle starts moving.

According to the vehicle 100 of the modified example, when the vehicle 100 starts traveling, large, or greater level of acceleration can be attained in a short period. Thus, the vehicle 100 of the modified example can provide the acceleration that the driver desires when starting the vehicle.

The above-described embodiment and the modified example show examples of the advancing compensation control by the drive motor 3 and the drive control of the engine 2. The control may be performed in an alternative manner. For example, a period for performing the advancing compensation control of the drive motor 3 and the drive control of the engine 2 may be changed in accordance with the actual accelerator operation amount or the amount of change in the actual accelerator operation amount.

According to the embodiment, the control for the acceleration and the drive force corresponding to the correction accelerator operation amount is performed after obtaining the correction accelerator operation amount based on the relationship of the correction accelerator operation amount and the amount of change in actual accelerator operation while maintaining the relationship of the amount of change in actual accelerator operation and the correction accelerator operation amount. However, the control is not limited to being based on the relationship of the correction accelerator operation amount and the amount of change in actual accelerator operation. For example, alternatively, the control may be performed on the basis of the relationship between the amount of change in actual accelerator operation and the drive force or target acceleration.

The control of the embodiment and the modified example is not limited to the control based on the predetermined and retained relationship, for example, the relationship between the amount of change in actual accelerator operation and the correction accelerator operation amount. Any method is applicable as long as being capable of performing the control so that the acceleration greater than the acceleration corresponding to the actual accelerator pedal operation amount can be outputted.

According to the construction of the embodiment, the drive force control system includes the engine (2) for controlling an output in accordance with an operation of the accelerator (accelerator pedal 401) of a vehicle, the drive motor (3) assisting a torque of the engine (2), the operation state detection portion (stroke sensor 402) detecting an operation state of the accelerator (401), and the control portion (integration ECU 24) performing an advancing compensation control by the drive motor (3) together with a drive control of the engine (2) on the basis of an amount of change of the operation state of the accelerator (401) generated within a predetermined time to provide greater acceleration than a case where the operation state of the accelerator (401) is maintained.

According to the construction of the embodiment, because the acceleration is increased compared to the construction in which the operation state is maintained when the operation state of the accelerator changes, the acceleration that a driver feels comfortable can be provided.

According to the construction of the embodiment, the control portion (integration ECU 24) performs the advancing compensation control by the drive motor (3) and the drive control of the engine (2) when the amount of change of the operation state of the accelerator (401) is greater than a predetermined value.

According to the construction of the embodiment, because the advancing compensation is performed in accordance with the amount of change, the acceleration that a driver feels comfortable can be provided.

According to the construction of the embodiment, the control portion (integration ECU 24) performs the advancing compensation control by the drive motor (3) and the drive control of the engine (2) to achieve a target drive force pre-bound as a target corresponding to the amount of change of the operation state of the accelerator (accelerator pedal 401).

According to the construction of the embodiment, because the drive control to achieve the target acceleration is performed, the acceleration that a driver feels comfortable can be provided.

According to the construction of the embodiment, after performing the advancing compensation control by the drive motor (3) and the drive control of the engine (2) to achieve a first target acceleration pre-bound to a first amount of change of the operation state of the accelerator, the control portion (integration ECU 24) performs the advancing compensation control by the drive motor (3) and the drive control of the engine (2) to achieve a second target drive force pre-bound to a second amount of change when the amount of change changes to a second amount of change that is different from the first amount of change on the basis of the operation state detected by the operation state detection portion (stroke sensor 402).

Because the acceleration control in accordance with the changes in the operation state is performed, the acceleration that a driver feels comfortable can be provided.

According to the construction of the embodiment, the control portion (integration ECU 24) restrains the advancing compensation control by the drive motor (3) and the drive control of the engine (2) when a specified time elapses after performing the advancing compensation control by the drive motor (3) and the drive control of the engine (2) on the basis of the amount of change of the operation state of the accelerator (accelerator pedal 401) generated within the predetermined time.

According to the construction of the embodiment, because the advancing compensation control is performed until the specified period elapses even if the amount of change in the operation state is assumed to be small, the acceleration that a driver feels comfortable can be provided.

According to the construction of the disclosure, the drive force control system includes the drive motor (3) for performing an output in accordance with an operation of the accelerator (accelerator pedal 401) of a vehicle, the operation state detection portion (stroke sensor 402) detecting an operation state of the accelerator (401), and the control portion (integration ECU 24) performing an advancing compensation control performing a torque assist by the drive motor (3) at an initial stage when the vehicle starts moving from a stopped state on the basis of an amount of change of the operation state of the accelerator (401) generated within a predetermined time to make acceleration at the initial stage of the accelerator operation be greater than at a normal operation after the vehicle starts moving.

According to the construction of the embodiment, because the acceleration when the vehicle starts moving is increased, the acceleration that a driver feels comfortable can be provided.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A drive force control system, comprising:
an engine configured to control an output in accordance with an operation of an accelerator of a vehicle;
a drive motor configured to assist a torque of the engine;
an operation state detection portion configured to detect an operation state of the accelerator; and
a control portion configured to perform an advancing compensation control by the drive motor together with a drive control of the engine, based on an amount of change of the operation state of the accelerator generated within a predetermined time, to provide greater acceleration of the vehicle than a case where the operation state of the accelerator is maintained,
wherein the control portion is configured to determine an actual operation amount of the accelerator based upon the operation state of the accelerator, calculate a correction operation amount that is a value different from the actual operation amount, and control the drive motor together with the drive control of the engine to accelerate the vehicle based upon the correction operation amount.

2. The drive force control system according to claim 1, wherein the control portion is configured to perform the advancing compensation control by the drive motor and the drive control of the engine when the amount of change of the operation state of the accelerator is greater than a predetermined value.

3. The drive force control system according to claim 2, wherein the control portion is configured to perform the advancing compensation control by the drive motor and the drive control of the engine to achieve a target drive force predetermined as a target corresponding to the amount of change of the operation state of the accelerator.

4. The drive force control system according to claim 3, wherein after performing the advancing compensation control by the drive motor and the drive control of the engine to achieve a first target acceleration predetermined to a first amount of change of the operation state of the accelerator, the control portion is configured to perform the advancing compensation control by the drive motor and the drive control of the engine to achieve a second target drive force predetermined to a second amount of change when the amount of change changes to the second amount of change that is different from the first amount of change.

5. The drive force control system according to claim 1, wherein the control portion is configured to restrain the advancing compensation control by the drive motor and the drive control of the engine when a specified time elapses after performing the advancing compensation control by the drive motor and the drive control of the engine on the basis of the amount of change of the operation state of the accelerator generated within the predetermined time.

6. The drive force control system according to claim 2, wherein the control portion is configured to restrain the advancing compensation control by the drive motor and the drive control of the engine when a specified time elapses after performing the advancing compensation control by the drive motor and the drive control of the engine on the basis of the amount of change of the operation state of the accelerator generated within the predetermined time.

7. The drive force control system according to claim 3, wherein the control portion is configured to restrain the advancing compensation control by the drive motor and the drive control of the engine when a specified time elapses after performing the advancing compensation control by the drive motor and the drive control of the engine on the basis of the amount of change of the operation state of the accelerator generated within the predetermined time.

8. The drive force control system according to claim 4, wherein the control portion is configured to restrain the advancing compensation control by the drive motor and the drive control of the engine when a specified time elapses after performing the advancing compensation control by the drive motor and the drive control of the engine on the basis of the amount of change of the operation state of the accelerator generated within the predetermined time.

9. The drive force control system according to claim 1, wherein the correction operation amount is greater than the actual operation amount.

10. The drive force control system according to claim 1, wherein
the actual operation amount is an actual amount of change of the operation state of the accelerator generated within the predetermined time, and
the correction operation amount is a corrected amount of change of the operation state of the accelerator.

11. The drive force control system according to claim 10, wherein the correction amount of change is greater than the actual amount of change.

12. The drive force control system according to claim 1, wherein the control portion is configured to calculate the correction operation amount based upon a predetermined relationship between the actual operation amount and the correction operation amount stored in a memory.

13. The drive force control system according to claim 10, wherein the control portion is configured to calculate the corrected amount of change based upon a predetermined relationship between the actual amount of change and the corrected amount of change stored in a memory.

14. A drive force control system, comprising:

a drive motor configured to perform an output in accordance with an operation of an accelerator of a vehicle;

an operation state detection portion configured to detect an operation state of the accelerator; and a control portion performing an advancing compensation control performing a torque assist by the drive motor at an initial stage, based upon an amount of change of the operation state of the accelerator generated within a predetermined time, to make acceleration of the vehicle at the initial stage be greater than acceleration of the vehicle at a normal stage, the initial stage including a stage where the vehicle starts moving from a stopped state and the normal stage following the initial stage, wherein the control portion is configured to determine an actual operation amount of the accelerator based upon the operation state of the accelerator, calculate a correction operation amount that is a value different from the actual operation amount, and control the drive motor to accelerate the vehicle in the initial stage based upon the correction operation amount.

* * * * *